Dec. 15, 1964 J. BARABÀS ETAL 3,161,717
MICROSCOPE SUBSTAGE ILLUMINATING DEVICE
Filed May 3, 1961 3 Sheets-Sheet 2

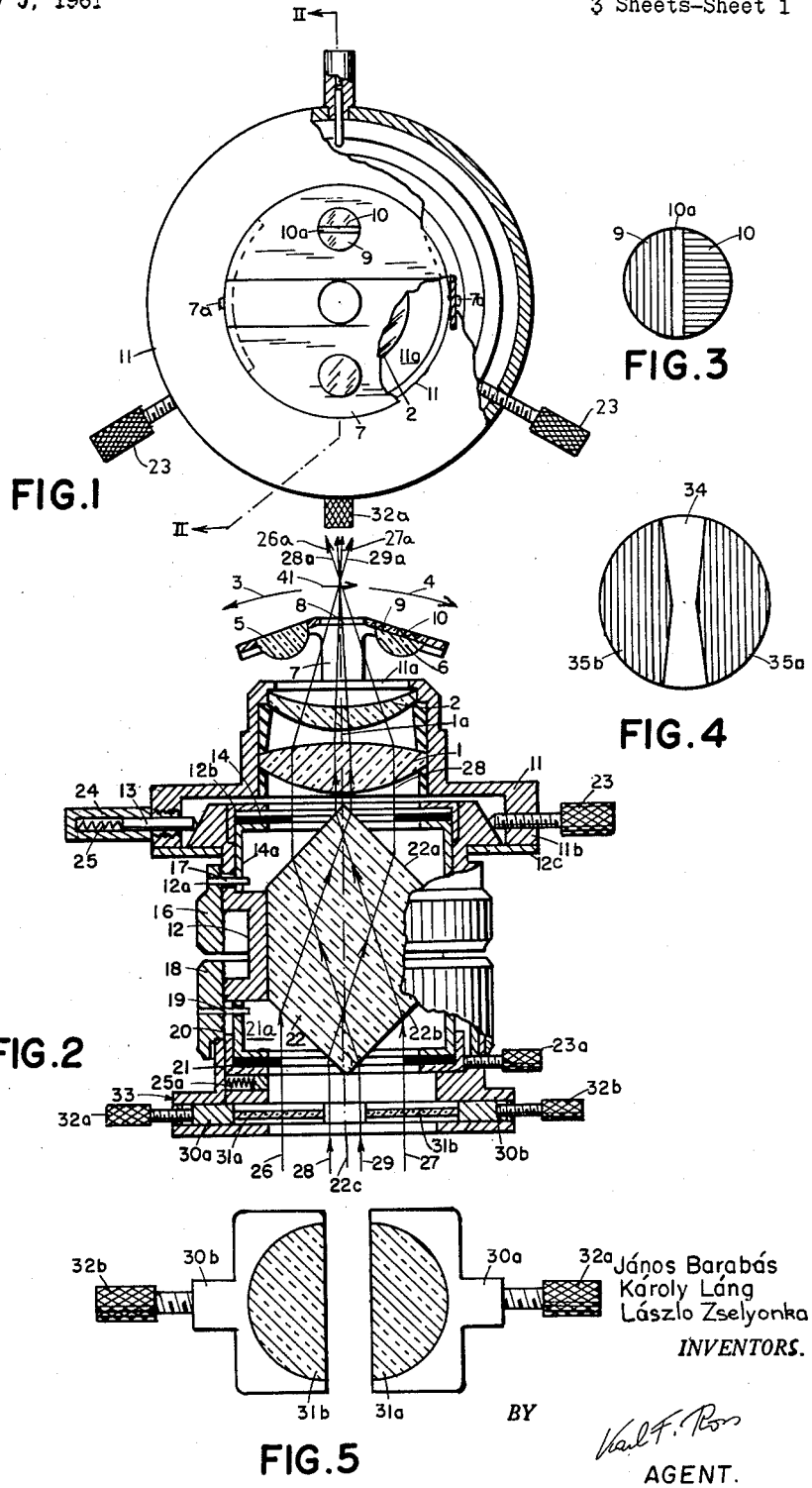

János Barabás
Károly Láng
László Zselyonko
INVENTORS.

BY Karl F. Ross
AGENT.

János Barabás
Károly Lána
László Zselyonka
INVENTORS.

BY

/Karl F. Ross/
AGENT.

3,161,717
MICROSCOPE SUBSTAGE ILLUMINATING DEVICE

János Barabás, 91 Attila u.; Károly Láng, 34 Daroczy ut.; and László Zselyonka, 74 Baross u., all of Budapest, Hungary
Filed May 3, 1961, Ser. No. 107,476
Claims priority, application Hungary May 4, 1960
10 Claims. (Cl. 88—40)

Our present invention relates to substage illuminating devices for microscopes and, more particularly, to a universal substage condenser system adapted to afford a wide diversity of illumination methods for the translumination of specimens held upon a microscope stage.

Substage illuminating devices, which are generally disposed below the specimen stage of a microscope, were heretofore generally so constructed as to be suitable for only one particular method of illumination (e.g. either bright-field, dark-field or phase-contrast illumination) and required interchanging with other specialized substage condenser systems when other methods were to be utilized. While some condenser systems have been proposed to provide a selection among several types of lighting arrangements, none of these has been capable of offering more than a limited versatility in specimen illumination.

It is, therefore, the principal object of our invention to provide an improved, highly versatile substage microscope-illuminating system.

Another object of the invention is to provide a universal microscope substage condenser designed for a large variety of illuminating methods including substantially all of the conventional methods and combinations of these methods with more recently developed ones.

Yet a further object of our invention is to provide a substage microscope condenser affording substantially complete control over the illumination of the specimen upon the microscope stage and providing improved illumination therefor.

According to a feature of the invention, a microscope having its objective disposed on one side of a specimen carried upon the microscope stage is provided with a substage illuminating device including obscuring means, such as, for example, a diaphragm of the adjustable iris type, and a refracting element disposed forwardly of the diaphragm in the path of illuminating radiation. The refracting element serves as a means for transposing the impinging bundle of rays, forming a beam whose cross-sectional area is controlled by the diaphragm, so that the outermost rays of this beam emerge as the innermost rays from the refracting element. Owing to this transposition, a shadow image of the obscured peripheral portion which may be reduced to zero in the fully opened condition of the diaphragm, is formed in the bundle of rays emanating from the refracting body and is projected onto the microscope stage via appropriate optical focusing means, such as one or more condenser lenses, to provide a dark field as a background for the specimen to be viewed. Since this dark field may be readily eliminated merely by opening the diaphragm until its aperture equals or exceeds the entrance pupil of the refracting body, the difficulties experienced in working with hitherto existing devices, wherein such central dark field can never be suppressed entirely, are obviated. The ray-transposing body is, advantageously, afocal and formed with complementarily refracting opposite surfaces of incidence and emergence, whose intersections with a plane including the optical axis of the body are straight lines, whereby the emerging rays are parallel to the incident ones. The preferably mirror-symmetrical surfaces may be either concave or convex outwardly and of triangular sectional configuration. While the refracting body should be generally cylindrical when used with circular condensing lenses and iris diaphragms and thus be formed with convex or concave conical end surfaces for the entering and exiting light rays, it will be apparent that prismatic bodies may also be employed wherein the entrance and exit surfaces will be polygonal.

The aforedescribed construction forms the basis of our universal condenser which enables the following principal methods of specimen illumination:

(a) Central bright-field illumination wherein the specimen is transluminated by direct rays which are collected by the microscope objective, this procedure being particularly effective for use with semi-transparent and/or stained specimens;

(b) Central dark-field or dark-ground illumination wherein the specimen background or field lies in the shadow of the diaphragm and the only rays collected by the objective are those reflected within the specimen so that the specimen appears illuminated upon a dark field;

(c) One-sided oblique illumination wherein the specimen is viewed with the aid of oblique rays striking the specimen from one direction and reflected into the objective by external surfaces of the specimen, this method being particularly suitable for the surface study of three-dimensional objects (e.g. crystals);

(d) Compound oblique and bright-field illumination wherein the specimen is illuminated both directly and by slanting rays which, in the absence of the specimen, would not enter the microscope objective and which are reflected into the latter to produce distinctive images of stained slides and the like;

(e) Compound oblique and dark-field illumination wherein only oblique rays reflected by the specimen appear in the objective and the image is viewed on a darkened background;

(f) Phase-contrast illumination along the lines of the techniques developed by Zernicke; and (g) Stereoscopic illumination for the production of three-dimensional images.

According to a more specific feature of the invention, the rays emerging from the refracting body pass through a further iris diaphragm adapted to control the cross-sectional area of the exiting bundle of rays to permit close adjustment of the illuminating field in dark-field illumination methods and to provide a peripheral dark field which is adjustable independently of the central dark field mentioned above. The rays then pass through suitable condensing lenses which focus the parallel emerging rays substantially at the specimen plane.

Still another feature of the invention resides in the provision of discriminating means, disposed in the path of the illuminating radiation, for dividing the bundle of rays into two independent and optically differentiated beams which illuminate the specimen from opposite sides and which then may be split into separate reflected beams adapted to form superimposable images providing stereoscopic effects. Such discriminating means may include a pair of conjugate polarizing filters with orthogonally related planes of polarization, selectively and adjustably insertable into the ray path, which co-operate with separating filters assigned to the objective or to a pair of such objectives designed for binocular viewing. The discriminating means may also be monochromatic filters adapted to pass complementary colors which co-operate with similar filters in the microscope to produce the three-dimensional images.

According to a further specific feature of the invention, at least the first-mentioned diaphragm is shiftable relatively to the optical axis of the refracting body and the latter is shiftable relatively to the axis of the objective with which it is usually aligned to permit the several types of illumination to be concentrated at any desired spot on the specimen.

The above and other objects, features and advantages of our invention will become more readily apparent from the following description, reference being made to the accompanying drawing in which:

FIG. 1 is a top-plan view of a substage condenser system according to the invention, with parts broken away;

FIG. 2 is a cross-sectional view taken along line II—II of FIG. 1 with part broken away;

FIG. 3 is a plan view of a polarizing element for the systems of FIGS. 1 and 2;

FIG. 4 is a plan view of a focusing lens forming part of the system and bearing graduated obscuring layers;

FIG. 5 is a plan view of a pair of other obscuring elements adapted to be used in the system;

Figure 6:
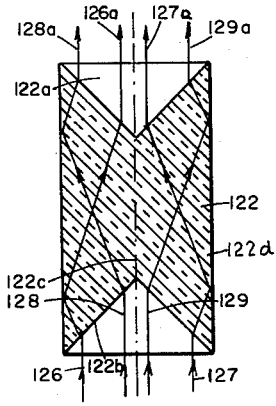
FIG. 6 is an axial cross-sectional view through a refracting body of a system according to another embodiment of the invention.

In FIGS. 1 and 2 we show a substage condensing system wherein a pair of positive focusing lenses 1 and 2 are axially spaced in a housing 11 whose aperture 11a is overlain by a swingable lens mount 7. The latter is articulated to the housing 11 at 7a and is provided with a central opening 8 and a pair of collective lenses 5 and 6 on opposite sides of the opening 8. Suitable indexing means, not shown but well known per se, may be employed to secure the lens mount 7 in any one of its three positions wherein either the unobstructed opening 8 or one of the two lenses 5 and 6 is disposed along the optical axis 1a of the condensing lenses 1 and 2 in line with the aperture 11a. A light-refracting body 22, preferably of circular cross-section, is held in a support 12, which is displaceable relative to the housing 11, and is formed of a light-transmitting material (e.g. glass). The incident and emergent surfaces 22b and 22a, respectively, of the body 22 are complementarily refracting right-circular convex conical surfaces. At the apex of the conical emergent surface 22a, the support 12 carries an iris diaphragm 14, of conventional construction, whose actuating member 14a is coupled via a pin 17 with a knurled or grooved ring 16 which is manually rotatable relatively to the support 12. The latter is formed with arcuate slot 12a through which the pin 17 passes.

The upper portion 12b of support 12 forms a shoulder 12c slidable on the surface 11b of housing 11 and constitutes a truncated conical member which may be shifted relatively to the optical axis 1a of lenses 1 and 2. The means for shifting the support 12, together with its diaphragm 14 and the refracting body 22, comprises a pair of adjustment screws 23 threadedly received in the housing 11 and bearing upon the portion 12b of the support; the screws 23 are angularly spaced by about 120° to permit the offsetting of the optical axis 22c of the combination of refracting body 22 and diaphragm 14 relative to axis 1a to any desired degree merely by an adjustment of the knurled heads of these screws. A pin 13, received in a casing 24, is urged against the support portion 12b by a spring 25 and forces the support against the screws 23. In the precise center position of support 12, the optical axis 22c of the body 22 coincides exactly with the axis 1a of the lenses 1 and 2.

Another diaphragm 21 is disposed within the support 12 level with the apex of the incident conical surface 22b of the refracting body. In a manner substantially identical with that described above for diaphragm 14, the iris leaves of the diaphragm 21 may be opened or closed to produce circular apertures of adjustable size upon a rotation of the setting ring 18, which is coupled to the actuating member 21a of the diaphragm 21 by the pin 19, relative to the support 12. The holder 20 for the diaphragm 21 is shiftable within its support 12 by a pair of positioning screws 23a threadedly received in the lower housing member 33. Thus, the refracting body 22 and the diaphragms 14 and 21 can be displaced together relatively to the optical axis 1a, or else the diaphragm 21 may independently be offset either from the objective axis 1a or from the axis 22c of the refracting body in order to direct any particular portion of the illuminating beam against a selected area of the specimen under study.

The co-operation of the diaphragms 14 and 21 with the refracting body 22 will now be explained with particular reference to FIGS. 2, 7 and 8 in order to facilitate an understanding of the operation of the system as applied to the various illuminating methods described hereinafter. As indicated in FIG. 2, with both of the iris diaphragms 14 and 21 fully open, the central rays 28 and 29 of a substantially parallel illuminating field (derived from a remote source not shown) impinge upon the conical entrance surface 22b of the refracting body 22 and are transposed therewithin to form the outer rays 28a and 29a at the conical exit surface 22a of the body. Similarly, the peripheral incident rays 26 and 27 are deflected within the body to form the central rays 26a and 27a upon emergence therefrom. The outgoing illuminating field 50 (FIG. 8), which is parallel to the incoming beam, is brought to a focus on the specimen 41 by the condensing lenses 1 and 2 and, if required, by the condensing lens 5 and 6 carried on the swingable mount 7. A gradual reduction in the aperture of primary diaphragm 21 will then produce a central dark spot of progressively larger cross-sectional area as shown in the projections 51 to 53 of FIG. 8 while a limiting of the aperture of secondary diaphragm 14 will produce a peripheral dark field as indicated in the projection 54 thereof.

In FIG. 6 we show another configuration of a refracting body in which a transposition of inner and outer rays of the incident beam again occurs without the obligatory formation of a dark spot centered on the optical axis of the system as is inherent in most hitherto known substage condensers. The complementarily refracting conical entrance and exit surfaces 122b and 122a of the cylindrical body 122 are mirror-symmetrically concave. Whereas the deflected rays within the afore described refracting body 22 converge internally upon the axis 22c thereof after refraction at the entrance surface 22b, the outer rays 126, 127 and the central rays 128, 129 of the beam incident upon the surface 122b are refracted divergingly away from the axis at this surface so as to be internally reflected at the cylindrical surface 122d of the body. The internally reflected rays then emerge from the exit surface 122a, where they are refracted complementarily to the refraction at the opposite surface 122b, in a beam parallel to the incident beam and with the peripheral and central rays transposed. The outer rays 126, 127 of the incident beam have thus been transformed into the central rays 126a, 127a of the emergent beam while the central rays 128, 129 have been converted into the peripheral rays 128a, 129a, respectively. The refracting body 122 thus may replace the body 22 of the system described with reference to FIGS. 1, 2 and 7.

Figures 12, 13:
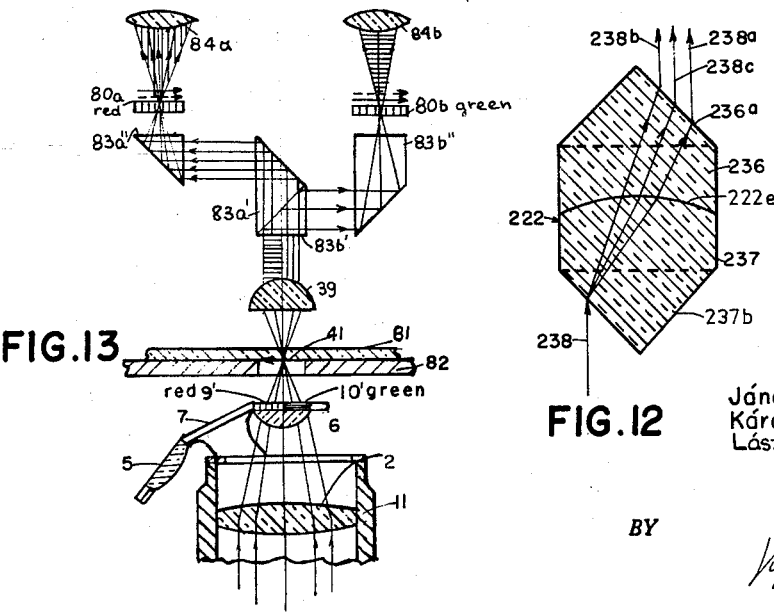
FIG. 12 is a view similar to FIG. 6 of another refracting body according to the invention.
FIG. 13 shows the system of FIG. 2 combined with a binocular viewing assembly therefor.

In FIG. 12 we show a refracting body 222 which also may be used in place of the refracting body 22 previously described, especially when the system of the invention is to be used predominantly with the well-known differential-color method of illuminating microscope specimens. The refracting body 222 is composed of two halves 236 and 237 cemented together at their interface 222e. The two halves are made of material of different light dispersibility except for monochromatic radiation of one particular frequency for which the materials are selected to have the same refractivity. The outward configuration of the refracting body 222, the two halves 236 and 237 being each formed with a respective conically convex refracting surface 236a and 237b as previously described. The upper half 236 of the refracting body 222 thus may be formed from flint glass while the lower half 237 thereof consists of crown glass, both glasses having substantially identical refractivities for light of the peripheral wavelength of the sodium spectrum. Thus, it is possible to use the refracting body 222 in a substage condenser for almost all methods of illumination without the disadvantages of the differential-color method when monochromatic sodium light is used as the illuminating radiation. When, however, it is desired to employ the differential-color method of illumination, it is merely necessary to substitute white of polychromatic light for the monochromatic radiation otherwise required. As indicated in FIG. 12, a ray 238 of polychromatic light is doubly refracted at the surfaces 237b and 236a and emerges dispersed into its spectrum represented by the monochromatic rays 238a, 238b, 238c whereof the red ray 238b and the violet ray 238a form calculable angles with the yellow (sodium) ray 238c which issues parallel to the incoming ray 238. The deviations from the parallel outgoing beam may be readily selected or corrected by an appropriate choice of the radius of curvature of the interface 222e so that the dispersed outgoing beam may be used in a conventional manner for illumination by the differential-color method.

Following is a description of the application of the invention to diverse illumination procedures.

*Illumination for Stereoscopic Viewing*

When the lens mount 7 (FIG. 2) is swung in the direction of the arrow 4, the front lens 5 is aligned with the condenser lenses 1 and 2, thereby concentrating the emergent rays 26a to 29a upon the optical axis 1a at a steeper angle than is the case in the absence of this lens. The rays, after being brought to a focus at the specimen 41, then diverge at a proportionately greater angle and are collected by an objective lens 39 (FIG. 7) of appropriately larger aperture. When microscope objectives of smaller aperture are to be employed, the front lens 5 is swung away and the opening 8 is aligned with the lenses 1 and 2 in the centered position of lens mount 7. In its third portion, occupied by the lens mount upon being displaced in the direction of arrow 3, the condensing lenses are brought into register with the lens 6 which is overlain by polarizing or color-discriminating means designed to split the illuminating radiation into two portions adapted to light the specimen independently and to be separated into two patrial images together constituting a steroscopic image.

The discriminating means may be formed from two orthogonally polarized filters 9 and 19 separated by a narrow opaque strip 10a which extends along a median plane of the body 22 and prevents passage of non-polarized light at the junction of the two filters. The specimen, in the third position of the lens mount, is consequently illuminated by two conjugate beams which may be separated by similar filters in the microscope. The latter, as illustrated in FIG. 13, is preferably provided in this case with twin objectives including eye pieces 84a and 84b as well as prism pairs 83a', 83a'' and 83b', 83b'', beyond objective lens 39, respectively receiving these beams. The specimen 41 is shown carried by a transparent slide 81 supported in turn by a microscope stage 82. This arrangement affords stereoscopic viewing characteristics of high-quality microscopes.

FIG. 13 also shows the polarized filters 9 and 10 replaced by color filters 9', 10' adapted to pass only a pair of complementary colors. The binocular viewing system accordingly includes a pair of similar color filters 80a, 80b in the respective ray paths.

*Central Bright-Field Illumination*

Figure 7:
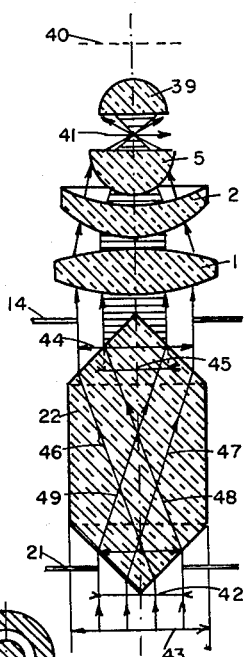
FIG. 7 is a diagrammatic view of the system of FIGS. 1–5 in one operating position.
Figure 8:
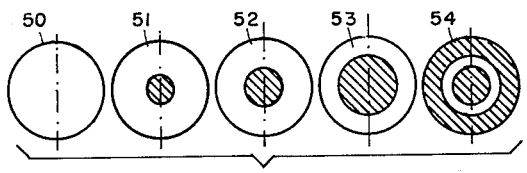
FIG. 8 shows a series of images produced by this system.

As shown in FIG. 7 and as preliminarily described above, when the aperture of the diaphragm 21 is increased to a diameter 43 which equals or exceeds that of the refracting body 22, the dark fields shown in images 51–54 of FIG. 8 will be eliminated entirely whereby the specimen 41 will be illuminated throughout its cross-section by uniformly distributed light rays so that it appears upon a clear background or field. While this method is not particularly suitable for transparent objects with little inherent or extrinsic contrast, it may be used with advantage for the examination of stained specimens.

*Central Dark-Field Illumination*

When the aperture of the diaphragm 21 is gradually reduced, a central dark field 45 (images 51–53 of FIG. 8), through which no rays of illuminating radiation pass, is produced and effectively sets off a transparent and otherwise insufficiently contrasting specimen. The latter is then illuminated by direct rays along the periphery of the dark field. The diameter of this dark field is usually selected so that the direct rays slant at a sufficiently large angle to the optical axis so as to obviate any possibility that they will normally enter the microscope objective 39. The only rays gathered by the latter will, consequently, be those reflected or diffused by the specimen so that the same will appear brightly illuminated upon a dark field.

*Phase-Contrast Illumination*

For the examination of transparent specimens differing only slightly from their surroundings in refractive index in accordance with the Zernicke phase-contrast method, a diffraction grating or the like is employed to produce interference between direct rays passing through uniform portions of the specimen and those diffracted by irregular portions thereof. As is well known, phase-contrast illumination must be provided in such manner that the annular illuminating beam coincides exactly with the phase rings developed at the focal plane 40 of the objective 39. If the optical axis 1a coincides with that of the objective and the phase rings, the diaphragms 14, 21 and the refracting body 22 are disposed therealong and the diaphragm 21 is adjusted so that the border of the central dark field 45 coincides with the inner edge of a phase ring while the diaphragm 14 is adjusted to bring the inner edge of the peripheral dark field into coincidence with the outer edge of that or an adjoining phase ring. The substage condenser thus permits the accommodation of the illuminating ring to phase rings of any width while the adjustment screws 23, 23a enable positioning thereof to produce exact coincidence.

*Compound Illumination*

In order to increase illumination effectiveness, one of the lenses 1, 2 may be designed as a carrier for an upper surface layer of varying opacity as indicated in FIG. 4. The light-absorbing layer is disposed on both sides of a diametrical gap 34, extending in the region of a median plane of body 22, in two outwardly diverging sectors 35a, 35b whose thickness and/or specific light-absorbing capacity increases outwardly from the center of the lens so as to result in a progressively greater opacity. The light passed through the gap 34 is of undiminished intensity while that traversing light-absorbing layers 35a, 35b, whose absorption increases from about 50% at the center of the lens radially outwardly to about 80% at the periphery thereof, is dimmed correspondingly from 50% to 20% and undergoes a certain diffusion due to the discontinuity of these layers. The specimen will then be illuminated by direct rays via the gap 34 upon a dark background affording progressively greater contrast outwardly from the center of the field. The loss in contrast due to direct illumination is reduced by the resulting compound translumination of the specimen with simultaneous suppression of the distortions normally produced by the deeply furrowed images characteristic of oblique illumination.

As illustrated in FIGS. 2 and 5, the obscuring means may also be in the shape of a pair of light-absorbing filters 31a and 31b carried by frames 30a, 30b which are independently displaceable in housing 33 into and out of the path of the incident light beam 26–29 with the aid of actuating handles 32a and 32b, respectively. When both of these sliding frames 30a, 30b are fully withdrawn, illumination of maximum intensity impinges upon the refracting body 22 and the system may function as described with reference to the other methods of illumination. When, however, they are brought close together to the extent shown in the drawing, a narrow transparent gap between them on both sides of a median plane of body 22 permits the passage of light of full intensity along opposite marginal areas of the transposed beam whereas a twilight zone, whose obscurity may be changed by a replacement of the filters 31a, 31b with others of different absorptivity, exists between these areas.

*Compound Oblique Bright-Field Illumination*

Figure 9:
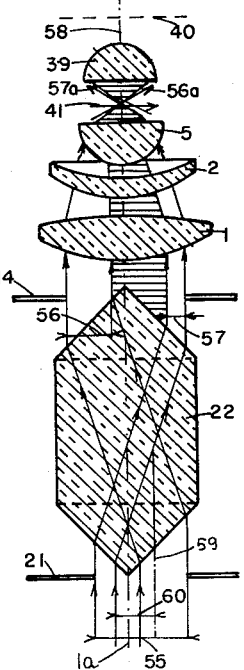
FIG. 9 is a view similar to FIG. 7 showing the system in another operating position.
Figure 10:
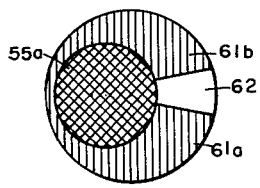
FIG. 10 is an illustration similar to FIG. 8 of an image as projected by the system of FIG. 9.

The method of combined oblique bright-field illumination according to the principles of the Barabás-Zselyonka system involves the formation of plastic images wherein the specimen is illuminated obliquely and appears upon a dark background surrounded by a shadow field of lesser obscurity. In this method, the optical axis 22c of the refracting body 22 coincides with the axis 1a of the condensing lens system 1, 2 and 5 and the axis of the microscope objective 39, while the axis 59 of diaphragm 21 is offset therefrom by a distance 60 (FIG. 9). The diaphragm 14 is in its wide-open condition whereas the diaphragm 21 is closed to form a restricted aperture of diameter 55. FIG. 10 is a view of the image projected at the focal plane 40 of the microscope 39. A black field 55a, whose area is proportional to the opening 55 of the diaphragm 21, is thus surrounded by a twilight area 61a, 61b of progressively varying darkness which is produced by the light-absorbing layers 35a, 35b as previously described, while the specimen whose image appears upon the black field 55a is illuminated by oblique rays 62 of full intensity. The location, the intensity and the size of the black field 55a may be adjusted by controlling the position and opening of the diaphragm 21 while the diaphragm 14 may be used to adjust the intensity of direct illumination.

*Compound Dark-Field Illumination*

When the opening 55 of diaphragm 21 is adjusted to increase the size of the black field 55a to prevent the direct-illuminating rays 62 and the diverging oblique rays 56a, 57a from entering the objective 39, the specimen will appear in indirect illumination upon a shaded background of varying darkness.

When the diaphragm 14 is partially closed and the diaphragm 21 centered on the axis 59 is fully opened, a narrow oblique beam of light will be directed against the specimen from right to left (FIG. 9), thereby illuminating the latter by slanting rays.

Figure 11:
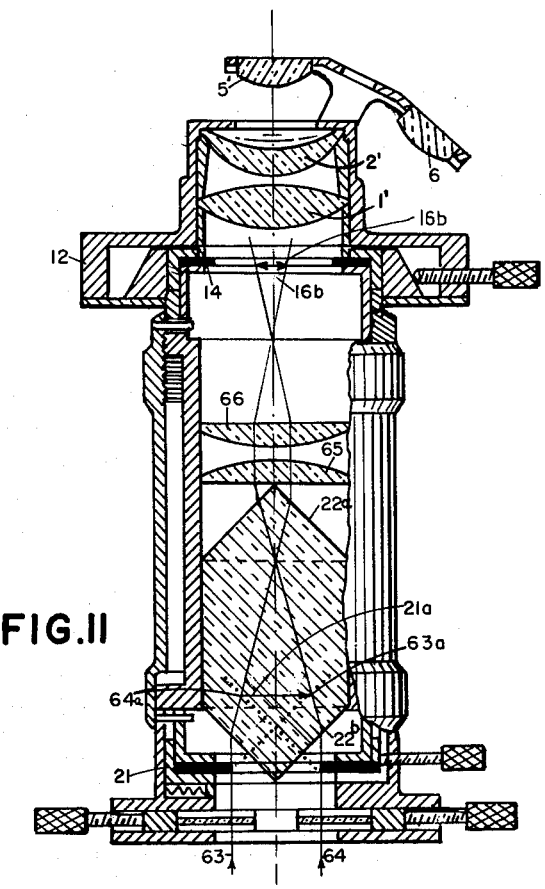
FIG. 11 is a view similar to FIG. 2 of a substage optical system according to still another embodiment of the invention.

In order to avoid perceptible distortions arising from the separation of the diaphragms 14 and 21 in condenser systems with small overall axial dimensions and relatively large apertures, we have discovered that it is possible to reduce the apparent distances between these two diaphragms through the use of an auxiliary lens system whose focus is located between the body 22' and the lenses 1', 2' and 5'. Such a system, shown in FIG. 11, is structurally and functionally similar to that of FIG. 2 and, therefore, does not require detailed description. A pair of collective lenses 65 and 66 are so dimensioned and positioned as to focus upon the primary focal plane of the objective system 1, 2 and 5 (or 6), which also contains the diaphragm 14, an image 21b of an area 21a which represents an inverted replica of diaphragm 21; thus, points 63 and 64 of the latter diaphragm form respective images at points 63a and 64a when rays originating thereat are refracted in the conical entrance surface 22b of body 22. The objective system beyond diaphragm 14 thus sees the diaphragms 14 and 21 brought to apparent coincidence in its object plane and sharply focuses their respective outlines upon the image plane at the level of the specimen to be illuminated.

The embodiments described and illustrated admit of many modifications which will be apparent to persons skilled in the art from the present disclosure when considered in light of current knowledge. Thus, either or both diaphragms 14, 21 may be made of light-absorbing rather than opaque material, as described with reference to filters 31a and 31b, and these filters as well as the diaphragms so modified may be given progressively increasing or decreasing light absorptivity as disclosed in connection with FIG. 4. The afocal refractive elements 22, 122, 222 illustrated in FIGS. 2, 5, 6 and 11 are also representative of bodies of prismatic-parallelopipedic rather than cylindrical-conical configuration, it being understood that the use of such bodies will afford ray transposition in only one plane so that the apertures of the associated diaphragms may be slots rather than circles. Finally, features shown and described with reference to a particular figure of the drawing may be utilized, within the limits of compatibility, in conjunction with features from other figures without departing from the spirit and scope of the invention except as limited in the appended claims.

We claim:

1. In a microscope substage illuminating device, in combination, an afocal refractive body positioned in the path of a bundle of light rays paralleling a reference line in a median plane of said body, said body being shaped to transpose light rays in said bundle remote from said line into a position close to said line and vice versa, adjustable diaphragm means positioned adjacent said body at the ray-entrance side thereof for selectively cutting off certain of said rays remote from said line, thereby creating a variable zone free from light rays in the vicinity of said line at the ray-exit side of said body, focusing means for the transposed rays at said exit side, supplemental lens means, and mounting means for said supplemental lens means adapted to position the latter in the path of the transposed light rays beyond said focus means, said supplemental lens means comprising two collective lens members alternately alignable with said focusing means, one of said lens members being provided with discriminating means for optically differentiating the transposed light rays on opposite sides of said median plane.

2. The combination according to claim 1 wherein said discriminating means comprises a pair of conjugate polarizing filters.

3. The combination according to claim 1 wherein said discriminating means comprises a pair of complementary color filters.

4. In a microscope substage illuminating device, in combination, an afocal refractive body positioned in the path of a bundle of light rays paralleling a reference line in a median plane of said body, said body being shaped to transpose light rays in said bundle remote from said line into a position close to said line and vice versa, adjustable diaphragm means positioned adjacent said body at the ray-entrance side thereof for selectively cutting off certain of said rays remote from said line, thereby creating a variable zone free from light rays in the vicinity of said line at the ray-exit side of said body, focusing means for the transposed rays at said exit side, and obscuring means partially interposed in the path of light rays from said bundle on at least one side of said body, said obscuring means comprising carrier means provided with two light-absorbing layers on opposite sides of a zone of high transparency located in the region of said median plane.

5. The combination according to claim 4 wherein said layers are of progressively increasing opacity in a direction away from said zone.

6. The combination according to claim 4 wherein said carrier means includes a lens forming part of said focusing means.

7. The combination according to claim 4 wherein said carrier means comprises a pair of adjustable supports movable relatively to said median plane at said entrance side.

8. In a microscope substage illuminating device, in combination, an afocal refractive body positioned in the path of a bundle of light rays paralleling a reference line in a median plane of said body, said body being shaped to transpose light rays in said bundle remote from said line into a position close to said line and vice versa, first adjustable diaphragm means positioned adjacent said body at the ray-entrance side thereof for selectively cutting off certain of said rays remote from said line, thereby creating a variable zone free from light rays in the vicinity of said line at the ray-exit side of said body, focusing means for the transposed rays at said exit side, and second adjustable diaphragm means disposed between said body and said focusing means for selectively cutting off some of the external rays of said bundle at said exit side.

9. The combination according to claim 8, further comprising lens means interposed between said body and said second diaphragm means for projecting an image of said first diaphragm means substantially upon the primary focal plane of said focusing means, said second diaphragm means being located substantially in said primary focal plane.

10. The combination according to claim 8, further comprising mounting means for said body, for said first diaphragm means and for said second diaphragm means, said mounting means being selectively adjustable for displacing said body and at least one of said diaphragm means relatively to each other and to the axis of said focusing means.

References Cited in the file of this patent

UNITED STATES PATENTS

| | | |
|---|---|---|
| 1,887,099 | Kraft | Nov. 8, 1932 |
| 1,973,066 | Hauser et al. | Sept. 11, 1934 |
| 2,881,654 | Toffolo | Apr. 14, 1959 |

FOREIGN PATENTS

| | | |
|---|---|---|
| 631,251 | Great Britain | Oct. 31, 1949 |